F. EICHBERG.
REPULSION MOTOR CONTROL.
APPLICATION FILED NOV. 18, 1911.

1,093,983.

Patented Apr. 21, 1914.

Witnesses:
Rudolf Grimmer
J. Ellis Glen

Inventor:
Friedrich Eichberg,
by
His Attorney

UNITED STATES PATENT OFFICE.

FRIEDRICH EICHBERG, OF BERLIN, GERMANY, ASSIGNOR TO GENERAL ELECTRIC COMPANY, A CORPORATION OF NEW YORK.

REPULSION-MOTOR CONTROL.

1,093,983.  Specification of Letters Patent.  Patented Apr. 21, 1914.

Application filed November 18, 1911. Serial No. 661,019.

*To all whom it may concern:*

Be it known that I, FRIEDRICH EICHBERG, a subject of the Emperor of Austria-Hungary, residing at Berlin, Germany, have invented certain new and useful Improvements in Repulsion-Motor Control, of which the following is a specification.

My invention relates to the control of alternating current motors of the repulsion motor type and its object is to provide a novel and simple arrangement whereby repulsion motors having voltages impressed on both the inducing winding and the induced winding may be reversed by shifting the brushes while maintaining the proper phase relations of the two impressed voltages.

My invention will best be understood by reference to the accompanying drawings in which—

Figure 1:
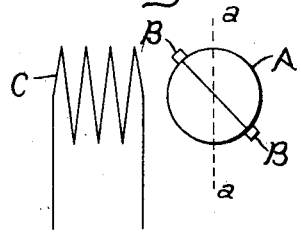
Figure 2:
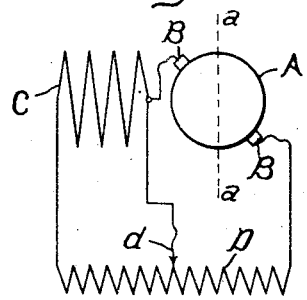
Figure 3:
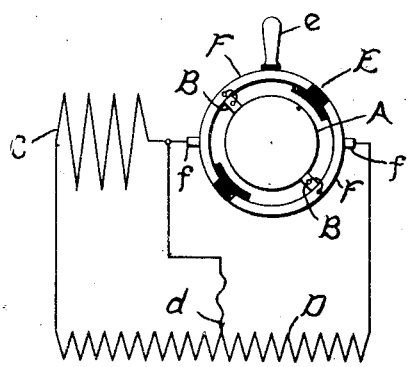

Figures 1 and 2 are explanatory diagrams and Fig. 3 shows diagrammatically a repulsion motor arranged in accordance with my invention.

Fig. 1 is a diagram of the well known repulsion motor in its simplest form. A represents the armature, B—B the short circuited commutator brushes and C the inducing winding on the stator on which voltage is impressed for operating the motor. It is well known that such a motor may be reversed by shifting the brushes. For instance, if the brushes B—B are moved from the position shown in Fig. 1 in a clockwise direction across the dotted line a—a, the motor will run in the opposite direction. It is also well known in the art that the efficiency and commutation of a repulsion motor may be improved by impressing a voltage on the rotor winding through commutator brushes in addition to that impressed on the stator winding. Such an arrangement is shown in the diagram of Fig. 2 in which D represents a transformer winding supplying the motor, and in which connections are established for impressing on the rotor winding through the commutator brushes a shunt voltage, the amount of which may be varied by moving the contacts d. If in the arrangement of Fig. 2 the connections for impressing the shunt voltage on the brushes are so made that this voltage is of the proper phase with respect to the voltage induced between the brushes by the inducing winding with the brushes in the position shown, then if the brushes are moved in a clockwise direction across the dotted lines a—a to reverse the motor, the relative phases of the voltage impressed on the brushes and the voltage induced between the brushes will not be correct because the induced voltage is reversed in phase by shifting the brushes as above described.

The purpose of my invention is to permit the reversal of a motor connected as in Fig. 2 in as simple a manner as is possible with that of Fig. 1 while preserving the proper phase relations between the impressed and induced voltages at the commutator brushes. An arrangement suitable for this purpose is shown in Fig. 3. The movable brush holder yoke is shown at E with a suitable handle indicated at e. On this yoke are carried segmental contacts F on which bear fixed brushes f. These contacts and brushes are included in the connections through which the shunt voltage is impressed on the commutator brushes B—B. When the brush holder yoke is moved in a clockwise direction to reverse the motor, the contacts F slide out from under the brushes f opening the circuit of these brushes, when the commutator brushes B—B reach the position indicated by the dotted lines a—a in Figs. 1 and 2. In this position no voltage is induced in the armature by the winding C. As the motion of the yoke is continued each segment F comes into engagement with the other brush f, so that at the same time that the phase of the induced voltage between the commutator brushes is reversed by shifting them to reverse the motor, the phase of the shunt voltage impressed on them is also reversed so that the relative phases of induced and impressed voltages are maintained the same.

I do not desire to limit myself to the particular construction and arrangement of parts shown and described, but aim in the appended claims to cover all modifications which are within the scope of my invention.

What I claim as new and desire to secure by Letters Patent of the United States, is—

1. In combination, an alternating current motor of the commutator type having an inducing winding and an induced winding locally short circuited through commutator brushes, connections for impressing voltages on both the inducing winding and the induced winding, means for shifting the brushes to reverse the motor, and means actuated by the brush shifting means for reversing the phase of the voltage impressed on the induced winding when said brushes are shifted to reverse the motor.

2. In combination, an alternating current motor of the commutator type having an inducing winding and an induced winding locally short circuited through commutator brushes, connections for impressing voltages on both the inducing winding and the induced winding, a brush holder yoke which is movable for reversing the motor, and means carried by said yoke for reversing the phase of the voltage impressed on the induced winding when said yoke is shifted to reverse the motor.

3. In combination, an alternating current motor of the commutator type having an inducing winding and an induced winding cally short circuited through commutator brushes, connections for impressing voltages on both the inducing winding and the induced winding, a brush holder yoke comprising two segmental contacts secured together but insulated from each other, a brush secured to substantially the middle point of each of the segmental contacts and adapted to bear on the commutator of the motor, additional brushes connected to the source of impressed voltage for said induced winding and adapted to bear on said segmental contacts, and means for shifting the position of said segmental contacts.

In witness whereof, I have hereunto set my hand this 31st day of October, 1911.

FRIEDRICH EICHBERG.

Witnesses:
  IWAN DÖR)
  LUDWIG M.